Patented Nov. 10, 1953

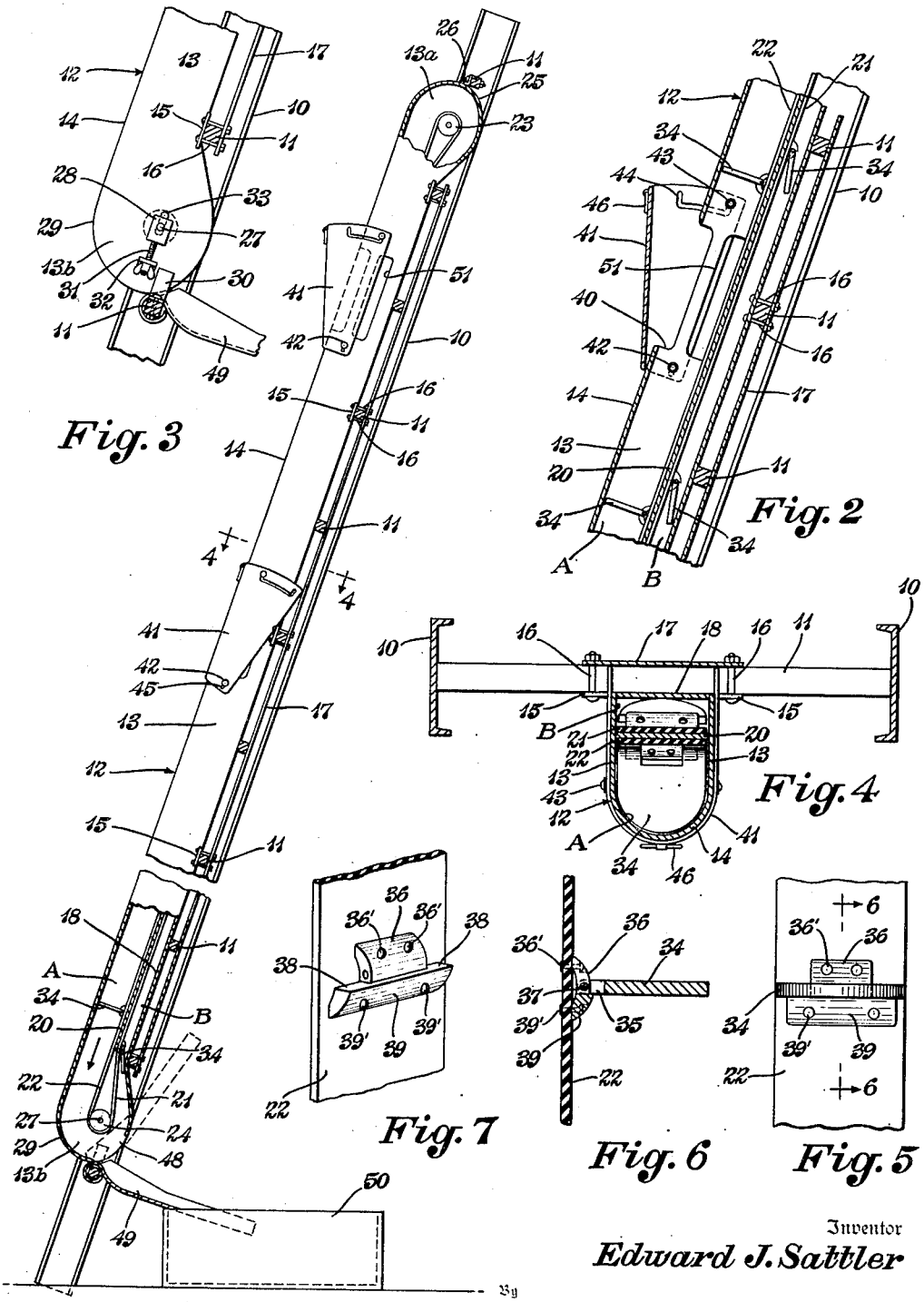

2,658,601

UNITED STATES PATENT OFFICE 2,658,601

FRUIT GATHERING LADDER

Edward J. Sattler, Mineral City, Ohio

Application October 18, 1950, Serial No. 190,814

5 Claims. (Cl. 198—37)

Certain prior fruit gathering ladders have been provided with endless belt conveyors having buckets attached thereto at intervals for carrying the fruit downwardly. In these constructions, the buckets project outwardly to such an extent as to be in the way of the picker, especially when the buckets are filled with fruit. Another disadvantage of these prior constructions is that, since the buckets are located at intervals, one bucket may move downwardly by gravity beyond the easy reach of the picker before the bucket is filled. Still another disadvantage is that the branches of the tree are very apt to obstruct downward passage of the buckets carrying fruit, and thus stop movement of the conveyor.

It is an object of the present invention to provide a novel fruit gathering ladder having a conveyor which is entirely enclosed and protected, and which is out of the picker's way at all times.

Another object is to provide a novel fruit gathering ladder having an enclosed conveyor provided with stationary fruit-receiving openings at spaced intervals, so that the fruit may be dropped into any one opening as long as the picker desires, while the conveyor transports the fruit to the ground slowly and without injury.

Another object is to provide a novel fruit gathering ladder which is provided with a conveyor housing preventing any moving part of the conveyor from being obstructed by the branches of a tree.

A further object is to provide a novel fruit gathering ladder having an enclosed conveyor belt and means for adjusting the amount of friction on the belt.

A still further object is to provide a novel fruit gathering ladder having an enclosed conveyor and possessing a light-weight construction which occupies a minimum amount of space, and which is inexpensive to make and convenient to use.

These and other objects are accomplished by the parts, constructions, arrangements and combinations comprising the present invention, a preferred embodiment of which is shown in the accompanying drawings and described in the specification as exemplifying the best known mode of carrying out the invention, the nature of the invetnion being set forth in the following general statement, and the scope of the invention being defined in the appended claims.

In general terms, the fruit gathering ladder of the present invention consists of a ladder having an endless belt conveyor movably mounted on the front side of the rungs, there being a tubular housing supported on the rungs and enclosing both runs of the belt on the front side of the rungs, said belt having flights hinged thereon at intervals and adapted to fold alongside the rear run of the belt, the housing extending around the front run of the belt and the flights in extended position, door openings in the front of the housing for allowing reception of fruit into the housing and onto said flights, and the friction on the belt being adjustable to regulate its rate of movement.

Referring to the drawing forming part hereof, in which a preferred embodiment of the invention is shown by way of example;

Figure 1 is a vertical sectional view of my novel fruit gathering ladder, with parts broken away and parts in elevation;

Fig. 2 is an enlarged fragmentary vertical sectional view through the conveyor housing;

Fig. 3 is an enlarged fragmentary sectional view similar to Fig. 1, showing the lower end of the housing in elevation;

Fig. 4 is an enlarged transverse sectional view as on line 4—4, Fig. 1;

Fig. 5 is an enlarged fragmentary elevation looking toward the belt and showing one of the flights in extended position;

Fig. 6 is a sectional view as on line 6—6, Fig. 5; and

Fig. 7 is a perspective view of the hinge mounting for one of the flights, with the flight removed.

Similar numerals refer to similar parts throughout the several views of the drawing.

The fruit gathering ladder of the present invention may be made entirely of lightweight metal such as aluminum, and preferably includes channel side rails 10 and rungs 11 of rectangular cross section. The ladder may be of any desired length. The tubular housing for the conveyor is indicated generally at 12 and extends longitudinally of the ladder preferably midway between the side rails, being supported on the front sides of the rungs 11.

Preferably the housing is U-shaped in cross section as shown in Fig. 4, having two parallel sides 13 connected together at their front or outer ends by a curved front wall 14. The sides are secured to a plurality of the rungs, preferably to every other rung, by means of pairs of outturned ears 15 secured to the inner ends of the side walls and abutting the rungs. The ears may be secured to the rungs 11 by bolts 16 which straddle the rungs and are secured to a plate 17 extending longitudinally along the underside of the rungs under the major portion of the tubular housing to protect the underside of the housing when the ladder is placed in a tree.

Preferably, a plate 18 extends longitudinally in abutment with the front sides of the rungs 11, and forms a closure for the inner side of the U-shaped housing 12. The tubular housing is divided longitudinally into front and rear compartments A and B by means of partition wall 20 extending parallel with the plate 18 and spaced forwardly thereof. The rear compartment B is relatively narrow and houses the upwardly moving return run 21 of the belt, and the front compartment A houses the front downwardly moving run 22 of the belt.

The two runs 21 and 22 of the belt are joined together at their ends to form an endless belt which is looped over a guide roller 23 at the top of the housing and over a guide roller 24 at the bottom of the housing. The guide roller 23 is preferably journaled in a usual fashion in the side walls 13a of the rounded upper end 25 of the housing, and bracket ears 26 on said end 25 may be secured to a rung 11 of the ladder as shown in Fig. 1.

The bottom roller 24 may have a shaft 27 which is journaled in bearings 28 adjustably mounted on the side walls 13b of the rounded lower end 29 of the housing. Said rounded lower end may have bracket ears 30 secured to the bottom rung as shown in Fig. 3. The bearings 28 are adjustable relative to the side walls 13b by means of adjusting screws 31 mounted in ears 32 on the side walls 13b, and the shaft 27 extends through longitudinal slots 33 in the side walls 13b. Thus, the shaft 27 may be adjusted longitudinally of the belt so as to tighten the belt and increase the friction thereon.

The belt 21, 22 is preferably made of a usual flexible composition material, and is provided at intervals with flights 34 which are hinged to the belt for folding in one direction toward the belt to lie alongside the same. As shown in Figs. 5, 6 and 7, the flights 34 are provided with ears 35 which are hinged to a hinge portion 36 by means of a pin 37. As viewed in Figs. 5 and 6, the flights can swing upwardly alongside of the belt run 22, but are prevented from swinging downwardly beyond an outwardly extended position by engagement of the ears 35 with shoulders 38 on a hinge portion 39. Thus, the flights 34 on the return run 21 can swing downwardly as shown in Figs. 1 and 2.

As shown at 36' and 39' respectively, the hinge portions 36 and 39 are preferably riveted to the belt and are curved outwardly of the belt on a radius which will conform to the rollers 23 and 24 as the belt moves around the same. The rounded end portions 25 and 29 of the housing are enlarged and spaced from the rollers 23 and 24 respectively by an amount sufficient to accommodate the flights 34 as they pass around the rollers.

As shown in Figs. 1 and 2, when the upwardly moving flights 34 enter the lower end of compartment B, they engage the closure plate 18 which slidably holds them in folded position as the belt moves upwardly through the compartment. This frictional engagement also helps to slow down the movement of the belt when the forward run 22 is moved downwardly by gravity due to the weight of fruit resting on one or more of the flights 34. The flights 34 may be allowed to drop by gravity to the extended position of Figs. 1 and 2 as they roll over the upper roller 23, or if desired a leaf spring of usual construction may be employed to hold them in folded position until they are manually extended as desired. As shown in Fig. 4, the outer ends of the flights are rounded to fit within the curved front wall 14 of the housing, when the flights are in extended position.

A plurality of vertically spaced fruit-receiving openings 40 may be provided in the upper portion of the housing front wall 14, and a cover or door 41 may be provided for each opening 40. Preferably, the doors 41 are U-shaped in cross section for telescoping closely over the housing, and the lower ends of the doors may be pivoted on the housing by pivot pins 42. The means for locking the doors 41 in open or closed position may consist of upper pins 43 extending through the side walls 13 of the housing and through U-shaped slots 44 in the doors, the pivot pins 42 extending through slots 45 in the doors, so that the doors 41 may be raised and swung inwardly or outwardly as desired, the pins 43 engaging in the ends of slots 44 to lock the doors in open or closed position. Ring handles 46 may be pivoted on the upper edges of the doors 41 for aiding in opening them.

The bottom rounded end 29 of the housing is provided in its rear portion with a discharging opening 48, and a chute 49 is pivotally mounted on the adjacent rung 11 for discharging fruit from the housing 12 into a suitable receptacle 50 positioned on the ground.

In the operation of the novel fruit gathering ladder, the ladder is first positioned with its upper end resting against the branches of a tree at a location adjacent the fruit to be picked. In sliding the upper end of the ladder into the tree, the rounded housing facilitates positioning the ladder without interfering with any of the branches, and the fact that the housing is positioned entirely along the front side of the ladder prevents damage to the housing by striking branches on the underside.

Once the ladder is positioned, the fruit picker climbs the same, and the smooth outer surface of the housing does not interfere with the movement of the picker up and down the ladder. After the picker has stationed himself at or adjacent to one of the receiving openings 40, he may pull open the door 41, as shown in Fig. 2, and may then look into the opening to observe the location of the nearest flight 34 below the opening. If the flight is spaced substantially below the opening, the picker may manually move the belt to bring a flight into proper position adjacent the opening. This may be done by reaching into the hand hole 51 provided through the side walls 13 of the housing and grasping the belt to move it manually up or down a slight amount sufficient to bring a flight 34 into proper position adjacent the bottom of the opening 40. If the flights 34 are held closed by spring plates, as previously described, the picker may manually extend one of the flights by reaching through the hand hole 51.

As the fruit is picked and dropped into the opening 40 to rest on the adjacent flight 34, the gradually increasing weight of the fruit will slowly move the front run 22 of the belt downwardly by gravity, so that the picker can continue to feed fruit into the same opening as long as it is desirable. If the belt conveyor tends to move downwardly too rapidly, the friction on the belt may be increased by the adjusting screws 31 to slow down the rate of movement of the belt.

Accordingly, the picker may constantly pick fruit and convey it to the bottom of the housing 12 where it is discharged through the opening 48 to roll down the chute 49 into the receptacle 50. By reason of having the flights 34 move downwardly past the stationary receiving openings 40 in the housing, the picker may continue to feed the fruit into any one of the openings as long as it is desirable, or may change his position to feed fruit into any other receiving opening according to the location of the fruit on the tree.

Due to the fact that the conveyor is enclosed at all times, there are no moving buckets to get in the way of the picker, or to be obstructed by the branches of the tree, and the novel construction is inexpensive and compact while greatly facilitating the operation of gathering fruit and conveying it to the ground without injury.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction.

Having now described the invention, the construction, the operation and use of a preferred embodiment thereof, and the advantageous new and useful results obtained thereby; the new and useful constructions, and reasonable mechanical equivalents thereof obvious to those skilled in the art, are set forth in the appended claims.

I claim:

1. In a fruit gathering ladder including side rails and longitudinally spaced rungs, a conveyor structure comprising an endless belt movably mounted intermediate the side rails and extending longitudinally thereof, both runs of said belt being positioned in front of said rungs, rigid flights hinged on the belt at longitudinal intervals and adapted to fold inwardly toward the belt, a tubular housing supported on said rungs on the front side thereof and enclosing both runs of said belt, said housing forming a front fruit gathering compartment extending around said flights in extended position, and said housing having longitudinally spaced front door openings for receiving fruit into said front compartment.

2. In a fruit gathering ladder including side rails and longitudinally spaced rungs, a conveyor structure comprising an endless belt movably mounted intermediate the side rails and extending longitudinally thereof, rigid flights hinged on the belt at longitudinal intervals and adapted to fold inwardly toward the belt, a tubular housing supported on the front side of said rungs and enclosing both runs of said belt, said housing forming a front fruit gathering compartment extending around said flights in extended position, a rear compartment extending around the flights in folded position, and said housing having longitudinally spaced front door openings for receiving fruit into said front compartment.

3. In a fruit gathering ladder including side rails and longitudinally spaced rungs, a conveyor structure comprising an endless belt movably mounted intermediate the side rails and extending longitudinally thereof, both runs of said belt being positioned in front of said rungs, rigid flights hinged on the belt at longitudinal intervals and adapted to fold inwardly toward the belt, a tubular housing supported on said rungs and enclosing both runs of said belt, said housing forming a front fruit gathering compartment extending around said flights in extended position, said housing having longitudinally spaced front door openings for receiving fruit into said front compartment, and hinged doors on said housing for closing said openings, said doors when closed conforming to the contour of the housing and when open providing chutes directed into the fruit gathering compartment of the housing.

4. In a fruit gathering ladder including side rails and longitudinally spaced rungs, a conveyor structure comprising an endless belt movably mounted intermediate the side rails and extending longitudinally thereof, rigid flights hinged on the belt at longitudinal intervals and adapted to fold inwardly toward the belt, means limiting the outward swinging of said flights on the front run of said belt, a tubular housing supported on said rungs and enclosing both runs of said belt, said housing forming a front fruit gathering compartment extending around said flights in extended position, said housing having longitudinally spaced door openings for receiving fruit into said front compartment, and hinged doors on said housing for closing said openings, said doors when closed conforming to the contour of the housing and when open providing chutes directed into the fruit gathering compartment of the housing.

5. In a fruit gathering ladder having a belt conveyor movably mounted longitudinally on its rungs, rigid flights hinged on said conveyor for being extended on the front side of said belt, means limiting the extending movement of said flights, a tubular housing supported on said rungs and enclosing both runs of the belt in front of said rungs, a longitudinal partition wall in said housing forming a front fruit gathering compartment enclosing the flights in extended position and a rear compartment enclosing the flights in folded position, said front compartment having a door opening in its upper portion for receiving fruit, and a hinged door for selectively closing said opening and providing an entrance chute therefor.

EDWARD J. SATTLER.

References Cited in the file of this patent

UNITED STATES PATENTS

| Number | Name | Date |
| --- | --- | --- |
| 463,178 | Vandenburg | Nov. 17, 1891 |
| 1,102,059 | Lance | June 30, 1914 |
| 1,458,313 | Sergeant | June 12, 1923 |
| 1,673,559 | Hanak | June 12, 1928 |
| 2,032,258 | Caton | Feb. 25, 1936 |
| 2,374,864 | Hawes | May 1, 1945 |